Sept. 23, 1952  A. M. KAMPER  2,611,886
POWER-TRANSMISSION MECHANISM
Filed Jan. 14, 1949  2 SHEETS—SHEET 1
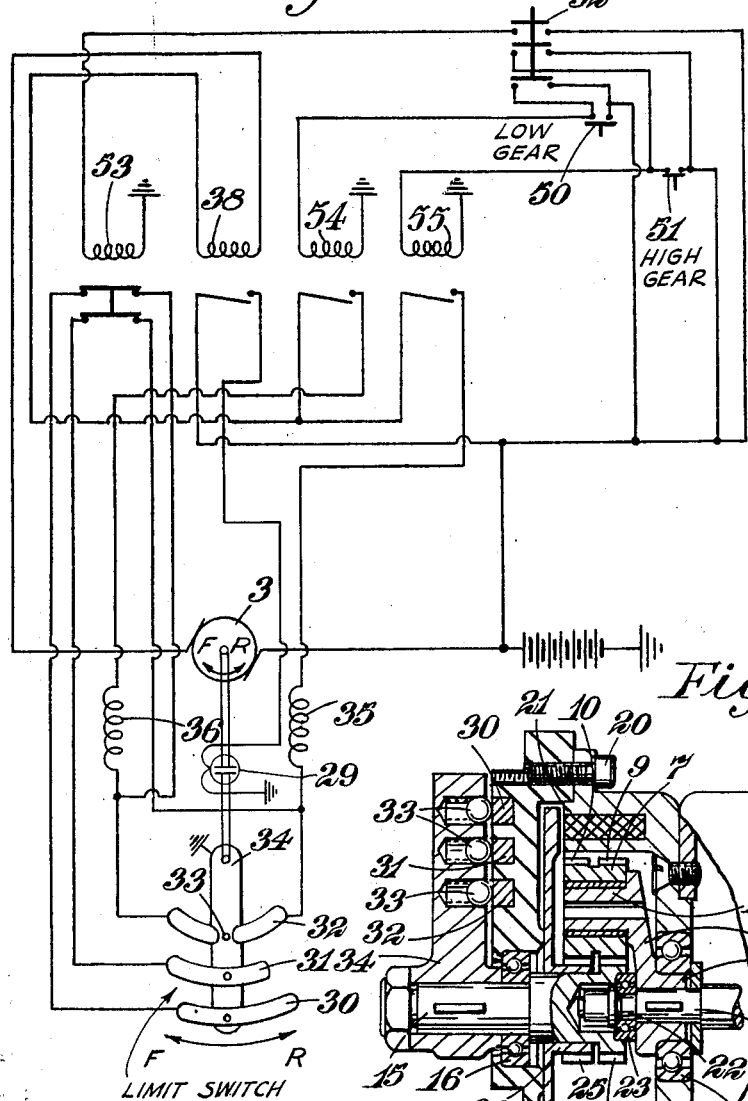
INVENTOR
ANDREW M. KAMPER

Sept. 23, 1952      A. M. KAMPER      2,611,886
POWER-TRANSMISSION MECHANISM

Filed Jan. 14, 1949

INVENTOR
A. M. KAMPER

Patented Sept. 23, 1952

2,611,886

UNITED STATES PATENT OFFICE 2,611,886

POWER-TRANSMISSION MECHANISM

Andrew Mathis Kamper, Coventry, England, assignor to Humber Limited, Coventry, England, a British company Application January 14, 1949, Serial No. 70,975
In Great Britain January 14, 1948

6 Claims. (Cl. 318—15)

This invention concerns improvements in or relating to power-transmission mechanisms incorporating epicyclic gearing.

The main object of the present invention is to provide such mechanisms with improved means for disconnecting the drive.

The invention is especially but not exclusively concerned with the application of such a transmission mechanism to the drive of a gear-shifting mechanism operated by an electric motor in which rotation of the motor to move the gear-shifting mechanism to the different gear or neutral positions is effected under the control of a limit-switch in circuit with the motor. It is of importance to ensure that the gear-shifting mechanism is stopped at the predetermined gear or neutral position. The usual practice is to employ frictional or electrical braking to stop the motor from rotating when the limit-switch cuts off the supply of electric current. This has been effected by a frictional magnetic clutch for braking the motor, or by a momentary reversing of the current in the motor field windings. The effect of the braking is to absorb the inertia of the rotating parts, such as the rotor of the motor, and the carrier and planet gears of the epicyclic gear train, but it is found that the precise position at which the parts come to rest is indeterminate.

The power-transmission mechanism according to the present invention comprises an epicyclic gear train connecting driving and driven members, a rotatable reaction gear in the gear train, an electrically-operated brake for braking the reaction gear to afford a drive between the members through the gear train, and an electrical limit-switch controlled by rotation of one of the members for automatically effecting disengagement of the brake so as to permit free rotation of the reaction gear and thereby disconnect the drive through the gear train.

In the application of the invention to gear-shifting mechanisms, the limit-switch may be operated by the driven member to disengage the brake after a predetermined angular movement of the driven member or when the driven member reaches a predetermined angular position corresponding to the desired position of the gears.

In one construction of mechanism according to the invention, the epicyclic gear train comprises one or more pairs of planet gears mounted to rotate as a unit on a carrier rotating with one member, one gear of each gear pair meshes with a sun-wheel fixed on the second member, and the second gear of the planet pair meshes with a second sun-gear, which second sun-gear is a reaction-gear mounted for free rotation. For braking of the reaction sun-gear, the reaction sun-gear may be rotatable with a brake plate, one face of which forms a friction surface for an electromagnet acting to brake the reaction sun-gear through the brake plate.

There will now be described by way of example one construction of power-transmission mechanism in accordance with the present invention as applied to a gear-shifting mechanism for two speeds of a variable ratio gear-box for a motor vehicle. This example will be described with reference to the accompanying drawings in which:

Figure 1 is a sectional view of the mechanism,

Figure 2 is a diagram showing the electrical connections, and

Figure 3:
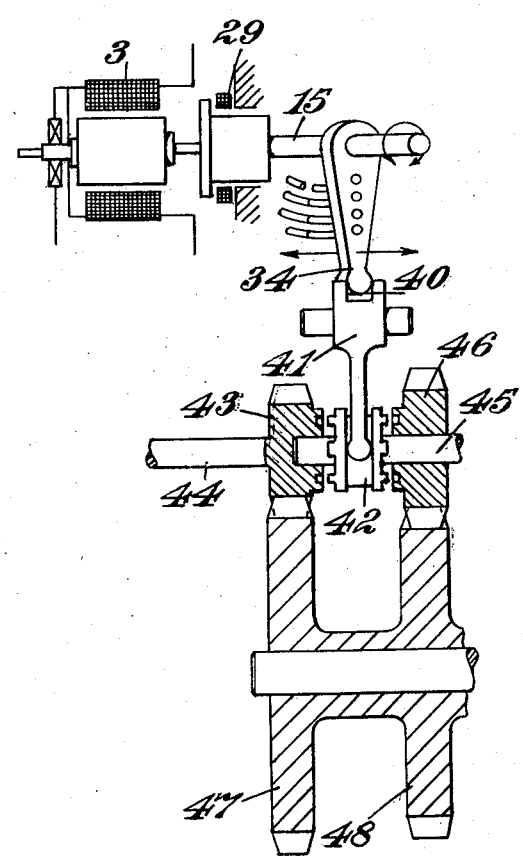
Figure 3 is a diagrammatic view showing the mechanism and the gears.

Against the flat end wall 1 of a shallow circular casing 2 is fitted a reversible electric driving motor 3. The motor shaft 4 projects into the casing through a central opening in the end wall. On an inner portion of the projecting motor shaft is keyed a boss 5 of a spider carrier 6 for a series of planet-gears 7. The carrier boss is mounted for rotation with the motor shaft in a ball-bearing 8 fitted within the end wall of the housing.

The carrier supports three pairs (only one pair is shown) of planet-gears equally spaced around the carrier. The two gears 9, 10 of each planet pair are formed co-axially as a unit for rotation on an axle-pin 11 projecting from the carrier. The number of teeth on the two gears and the diameters thereof are selected in accordance with the gear reduction required. The difference in the diameters of the two gears is small and they have, for simplicity been shown as of the same diameter which is not an operative arrangement.

The inner gears 9 of the planet pairs adjacent the carrier are in mesh with a sun-gear 14 at the inner end of a driven shaft 15 within the casing. This driven shaft is aligned with the driving or motor shaft 4, and it is supported for rotation within a ball-bearing 16 fitted in a cover-plate 17 of electrical insulation material secured over the open end of the casing remote from the motor. Screws 20 pass through a flange on the casing into the flanged rim or the cover-plate in order detachably to secure the cover-plate in position with its rim around an annular spigot 21 on the face of the casing.

The end of the driven shaft 15 within the casing has a counter-bore to receive the projecting end 22 of the driving shaft, which is here supported by a ball-bearing 23 fitted in the bore of the driven shaft.

Mounted behind the sun-gear 14 on the inner end of the driven shaft is a second sun-gear 25, or reaction sun-gear, which is in mesh with the outer gears 10 of the planet pairs. The reaction sun-gear is carried by a cuff 26 which is a sliding and rotational fit on the driven shaft. On the cuff is a radial brake-plate 27 with an enlarged rim 28 which projects into an annular space between the cover-plate 17 and the rim of the casing. In the rim of the casing is an annular recess housing an electro-magnet 29. This electro-magnet is controlled by a limit-switch constituted by three fixed arcuate contact strips 30, 31, 32 on the outer face of the cover-plate and co-operating spring-loaded steel ball contacts 33 carried by a gear-shifting lever 34 keyed on the driven shaft 15 externally of the casing and its cover. The three arcuate strips are concentric with the driven shaft and the innermost strip 32 is divided into two electrically separated portions. The two continuous contact strips 30, 31 are, in use, connected respectively in series with forward and reverse field windings 35, 36 of the motor 3 and are also both connected in series with the coil 38 of a relay controlling the power supply to the electro-magnet of the reaction gear brake 29. This relay is also used to control a main clutch, not shown. The two strips 30, 31 subtend approximately the same angle at the centre of curvature but are out of alignment at their ends so that as the gear-shifting lever 34 is rotated in either direction it moves beyond the end of one contact but maintains connection with the other. The third, divided, strip 32 has one portion in series with the forward field winding 35 and the other portion in series with the reverse field winding 36, the arrangement being that energisation of either portion causes the motor to rotate the arm towards the centre of the strip. Both portions are in series with the relay coil 38. The ends of the strip 32 are in radial alignment with the outer limits of the continuous strips.

The complete assembly is bolted to the side of the gear-box casing, and the gear-shifting lever 34 engages in a suitable slot 40 in the operating fork 41 of the gear-box. The fork 41 engages in a sliding dog-clutch member 42 which may be moved from the neutral position shown to clutch either the gear 43, which is integral with the driving shaft 44, to the driven shaft 45 thereby to provide a direct one to one ratio drive or to clutch the gear 46 to the driven shaft thereby to provide an indirect low ratio drive through the gear train 40, 47, 48, 46.

In the operation of the device when it is desired to bring into operation a drive of one ratio power is supplied (e. g., by operation of one of a pair of push buttons 50, 51 which are appropriated to the two ratios and control relays 54, 55) to one of the continuous contact strips 30, 31 which energises the motor for rotation in the appropriate direction and also energises the relay 38 to engage the reaction gear brake. The motor thus rotates and drives the epicyclic gear train (i. e. it rotates the outer planet-wheels round the braked reaction sun-wheel and thereby causes the inner planet-wheels to drive the other sun-gear) to move the arm 34 until the ball contact runs off the end of the continuous contact strip through which power is being supplied. This releases the brake and at the same time cuts off power to the motor. If it is then desired to bring into operation the drive of the second ratio power is supplied (by operation of the other of the push buttons 50, 51) to the other continuous strip which causes the motor to swing the arm back to the further limit where the contact ball runs off that strip. To move the gears into a neutral position power is supplied to the divided strip by operation of the push button 52 which causes the motor to rotate the arm to the centre position in which the ball contact lies between the two portions of the strip. Operation of the push-button 52 energises a relay 53 which breaks the circuits to the strips 30, 31.

When the brake is released the reaction sun-gear is free to rotate and the gear-shifting lever stops almost instantaneously. The electric motor is then free to free-wheel to a stop without shock.

I claim:

1. Driving mechanism comprising rotatable driving and driven members, a reversible electric motor with an operable connection for rotating the driving member in either direction of rotation, two motor-operating electric circuits and switch means for selectively energizing the motor to run in either direction, an epicyclic gear train connecting the driving and driven members and including a rotatable reaction gear, an electrically operable brake for braking the reaction gear to afford a drive between the driving and driven members through the gear train, two limit-switches one in each of the two motor-operating circuits and appropriated to two end positions in the rotation of the driven member, a third limit-switch appropriated to an intermediate position in the rotation of the driven member and having contacts in shunt circuits around the aforesaid two limit-switches for operating the motor in the two directions, means for automatically energizing the brake circuit to apply the brake when any of the motor operating circuits is energized and for deenergizing the brake circuit when the motor circuit is broken, and a switch operating member movable with the driven member for operating the three limit switches to break the motor circuit at the positions respectively corresponding to the end and intermediate positions of the driven member to which the switches are appropriated.

2. Driving mechanism as claimed in claim 1 in which the epicyclic gear train comprises a carrier rotatable with one of the driving and driven members, at least one pair of planet gears mounted on the carrier to rotate as a unit therewith, a sun-wheel fixed on the other of the driving and driven members and meshing with one of the pair of planet wheels, and in which the reaction wheel is constituted by a second sun-wheel which meshes with the second of the pair of planet wheels and is mounted for free rotation.

3. Driving mechanism as claimed in claim 2 in which the brake for braking the reaction gear comprises an electro-magnet and a brake-plate which is rotatable with the reaction sun-wheel which provides an armature for the magnet and which has a friction surface on one face for friction braking with the magnet when the armature is attracted thereby.

4. Driving mechanism as claimed in claim 1 in which each end limit-switch comprises a strip contact and a moving contact movable relatively to the strip contact by the switch operating member, the strip contact having an operative length and position such that the movable contact makes electrical connection therewith during the whole of the movement of the driven member until the end position is reached when the movable contact runs off the end of the strip to break the circuit.

5. Driving mechanism as claimed in claim 4 in which the intermediate limit-switch comprises a pair of strip contacts in end-to-end relation with a gap between the ends and a moving contact movable relatively to the said pair of strip contacts by the switch operating member, the said pair of strip contacts being appropriated to the two end positions respectively and having operative lengths and positions such that the movable contact makes electrical connection during the whole of the movement of the driven member from each end position with the contact strip appropriated to that end until the movable contact runs off the strip into the gap between the pair of strip contacts to break the circuit.

6. Driving mechanism comprising a reversible electric motor having two field windings for forward and reverse rotation respectively, the motor constituting a driving member, two motor-operating electric circuits each containing one of the two field windings, switch means for selectively energizing the two circuits, an oscillatable driven member, an epicyclic gear train connecting the driving and driven members and including a rotatable reaction gear, an electrically operable brake for braking the reaction gear to afford a drive between the driving and driven members through the gear train, two limit-switches one in each of the two motor-operating circuits and appropriated to two end positions in the rotation of the driven member, means for automatically energizing the brake circuit when either of the motor-operating circuits is energized and for disengaging the brake when the motor circuit is broken and a switch operating member movable with the driven member to operate the two limit-switches respectively at the positions corresponding to the end positions of the driven member to which the switches are appropriated.

ANDREW MATHIS KAMPER.

REFERENCES CITED

The following references are of record in the file of this patent:

UNITED STATES PATENTS

| Number | Name | Date |
|---|---|---|
| 1,330,790 | Dean | Feb. 17, 1920 |
| 2,019,671 | Gille et al. | Nov. 5, 1935 |
| 2,259,437 | Dean | Oct. 21, 1941 |
| 2,272,934 | Cotal | Feb. 10, 1942 |
| 2,385,630 | Lear | Sept. 25, 1945 |
| 2,449,797 | Waldie | Sept. 21, 1948 |
| 2,499,166 | Russell | Feb. 28, 1950 |

FOREIGN PATENTS

| Number | Country | Date |
|---|---|---|
| 219,929 | Great Britain | Mar. 6, 1924 |